United States Patent

Matsuda et al.

[11] Patent Number: 5,957,740
[45] Date of Patent: Sep. 28, 1999

[54] DAMPER FOR A PERSONAL WATERCRAFT

[75] Inventors: Yoshimoto Matsuda, Kobe; Shinji Shutou, Kakogawa, both of Japan

[73] Assignee: Kawasaki Jukogyo Kabushiki Kaisha, Japan

[21] Appl. No.: 08/946,044

[22] Filed: Oct. 7, 1997

[30] Foreign Application Priority Data

Oct. 11, 1996 [JP] Japan ................................. 8-269836

[51] Int. Cl.⁶ ................................................. B63H 1/15
[52] U.S. Cl. ................................. 440/52; 464/75; 74/574; 114/270
[58] Field of Search ................................. 440/52; 464/75, 464/180; 74/574; 114/270

[56] References Cited

U.S. PATENT DOCUMENTS 4,787,868  11/1988  Hoshiba et al. ........................... 440/52
5,050,446   9/1991  Takashima et al. ....................... 464/75

OTHER PUBLICATIONS

Japanese Laid Open Publication No. HEI 1–45923(SHO 64–45923) with Patent Publication No. HEI 8–23304 with an English abstract thereof (Publication No. 01045923 A).

Japanese Laid Open Publication No. HEI 8–152046 with an English abstract thereof (Publication No. 08152046 A).

Japanese Utility Model Publication No. SHO 53–25062 with an English translation thereof.

*Primary Examiner*—Jesus D. Sotelo
*Attorney, Agent, or Firm*—Oppenheimer Wolff & Donnelly LLP

[57] ABSTRACT

A damper which can be easily fitted to the engine E of a personal watercraft W having little space, said damper damping the torsional vibration caused by the torsional stress acting on the crankshaft 1 of the engine E mounted in a personal watercraft W. A flange 2, which is a component of the coupling D that couples the crankshaft 1 and the propeller shaft 11 of a propulsion pump P, is fixed to the end of the crankshaft 1 which is adjacent to the pump P. The damper includes a damping mass fixed via an elastomeric member 4 to the periphery of a flange 2 in such a manner that the mass 5 can elastically move with respect to the crankshaft 1 in the direction of rotation.

10 Claims, 10 Drawing Sheets

DAMPER FOR A PERSONAL WATERCRAFT

FIELD AND BACKGROUND OF THE INVENTION

The present invention relates to dampers for an engine and a propulsion pump which are mounted on a personal watercraft.

High torsional stress caused by torque acts on a crankshaft of an engine, and in particular of an automobile engine, which needs to rotate at a high speed. In order to resist the torsional stress, the crankshaft is designed to have an allowable torsional stress which is higher than the torsional stress acting on the crankshaft. In order to make the allowable torsional stress of the crankshaft higher, it is necessary to increase the sectional area of the crankshaft. This increases the engine weight. However, such increase in weight is contrary to the effort in recent years to lighten the weight of vehicles in order to reduce the fuel consumption and save resources.

When the torsional stress acting on the crankshaft exceeds the allowable torsional stress of the crankshaft, the durability of the crankshaft decreases, and the vibration and noise from the engine due to the torsional stress increases. In the case of an engine in a four-wheeled vehicle, it is known that for reducing the torsional vibration of the crankshaft a damping mass (weight) is fixed through an elastic member to the pulley which drives a cooling fan or a water pump, and is fixed to the front end of the crankshaft.

In the case of a motorcycle engine, as shown in FIG. 9 of the accompanying drawings, it is known that a damping mass 105 may be fixed to the longitudinal outer side portion of a magneto rotor 114 which is fixed to a front end 101a of the crankshaft for reducing the torsional vibration thereof (Japanese Patent Publication H.8-23304).

For personal watercraft, various measures have been taken to damp the torsional vibration caused by the engine rotation. For example, Japanese Utility Model Publication S.53-25062 discloses elastomeric (i.e. synthetic or natural polymers which are elastic, e.g. rubber buffers) members arranged in a coupling, interconnecting a crankshaft of an engine and a propeller shaft of a propulsion pump, in order to reduce the transmission of the torsional vibration of the engine to the pump.

This coupling, as shown in FIG. 10 of the accompanying drawings, includes a pair of flanges 102,112 each fixed to the adjacent ends of the crankshaft 101 and propeller shaft 111. The flanges include axially extending claws 102b and 112b. The claws 102b of flange 102 and the claws 112b of flange 112 protrude axially toward the each other, and overlap each other when rotating (overlap each other in an axial direction in FIG. 10). The elastomeric member 113 is interposed between adjacent claws 102b and 112b.

In order to further damp the torsional vibration from the engine of a personal watercraft, it might be possible to provide a damper, as in the case with the foregoing motorcycle, by providing additional space at the front out side portion of the crankshaft. For a personal watercraft, however, it is necessary to arrange the engine and accessories (auxiliary parts) very compactly in the small inner space of a body. More specifically, there is a need to arrange most of the engine, the fuel tank, the battery, the muffler and the other parts in the space defined between the hull and the deck. Furthermore, walls of the bulkhead and the pump chamber are arranged with little room or clearance rearward of the engine. Accordingly, under these circumstances, there is no available space in which the damper can be fitted in the manner that the motorcycle damper is fitted.

Furthermore the dampers of personal watercraft are used in an environment of fresh or saltwater except when the damper is fitted in substantially closed casings, like a crankcase. It is necessary for the damper used in such an environment to be directly visible when daily checks are made, and to be easily replaced.

Many of the engines mounted on personal watercraft are also supplied with fuel through a carburetor. The engine vibration, and in particular the torsional vibration in the normal revolution speed range of the engine makes it difficult to optimally set the fuel ratio of the carburetor for the revolution speed range of the engine, and to maintain this ratio.

Technical problems special to personal watercraft also include the torsional vibration at the propeller shaft of the propulsion pump. This torsional vibration causes cavitation on the surface of the pump impeller blades which reduces the propulsive force. It is therefore desirable to damp the torsional vibration of the propeller shaft as much as possible.

SUMMARY OF THE INVENTION

In view of the foregoing, it is a first object of the present invention to provide a torsional vibration damper which can be easily fitted to an engine mounted in a personal watercraft, which has little space or room. It is a second object of the invention to provide a torsional vibration damper which can be easily fitted to a propulsion pump mounted in a personal watercraft, which has little space or room.

According to a first aspect of this invention, there is provided a damper for damping the torsional vibration caused by the torsional stress acting on a crankshaft of a propulsion engine mounted in a personal watercraft, characterized in that a damping mass is fixed to the periphery of a flange by an elastomeric (i.e. synthetic or natural polymers, e.g. rubber, which are elastic) member in such a manner that the mass can elastically move with respect to the crankshaft in the direction of rotation, said flange, which is a component of a coupling that couples the crankshaft and a propeller shaft of a propulsion pump, being fixed to the rear end of the crankshaft.

By providing such a damper, it is possible to effectively use for the damper the space around the periphery of the flange of the conventionally fitted coupling. This damping mass, which is fixed through the elastomeric member to a flange which is fixed to one end of the crankshaft, belongs to the same vibration system which the crankshaft belongs to. In relation to the torsional force, the mass is out of phase with the torsional stress acting on the crankshaft. As a result, the torsional forces cancel each other. Thus, the torsional vibration and the noise of the crankshaft is reduced. The damper is fixed to the coupling which is visible and therefore the damper can easily be inspected and easily attached and removed in comparison with a conventional damper.

The elastomeric member may be fixed to the periphery of the flange of the coupling via a sleeve. This makes it possible to separately produce the flange of the coupling and other peripheral parts (damper unit) which includes the sleeve, the elastomeric member and the damping mass, and then assemble them. It is also possible to change the damping mass capacity by replacing the sleeve, the elastomeric member and the damping mass together as a unit. It is therefore easy to change the mass, simply and quickly.

It is preferable that the watercraft's engine, which includes a generator with a magneto rotor fixed to a front end of the crankshaft, should also include a second damper. The second damper includes a damping mass fixed through an elastomeric member to the periphery of the rotor in such a manner that this mass can elastically move with respect to the crankshaft. The second damper is positioned in the small space around the periphery of the magneto rotor. It is therefore possible to fit the damper compactly in the engine casing without elongating the engine longitudinally. The damping masses of the dampers at both ends of the crankshaft may have different natural frequencies. This makes it possible to obtain a damping effect in a wider frequency range where the damping effects of the dampers are cumulative.

According to a second aspect of this invention, there is provided a damper for damping the torsional vibration caused by the torsional stress acting on a crankshaft of a propulsion engine mounted on a personal watercraft, characterized in that a damping mass is fixed to the periphery of a fitting member by an elastomeric member in such a manner that the mass can elastically move with respect to the crankshaft in the direction of rotation, said fitting member being bolted to a side surface of a flange, which is fixed to the rear end of the crankshaft; the flange being a component of a coupling which couples the crankshaft and a propeller shaft of the propulsion pump. This damper is easy to mount and remove by tightening and loosening the bolts, respectively. Therefore, it is easy to replace the damping mass with another damping mass having a different weight or with a new damping mass.

The fitting member may take the form of a ring, which is shaped like a "T" in axial section, and the damping mass may be positioned around the periphery of the fitting member. This structure is simple because of the damping mass being positioned around the periphery of the flange.

According to a third aspect of this invention, there is provided a damper for a personal watercraft including an engine for propulsion and a propulsion pump which are mounted thereon, the engine including a crankshaft coupled to a propeller shaft of the pump through a coupling, which includes first and second flanges, each of the flanges including claws protruding axially toward the other flange, the claws of the first flange alternating with the claws of the second flange in the direction of rotation, the coupling further including an elastomeric buffer interposed between the flanges for transmitting power from the engine to the pump, the elastomeric buffer including a circular body portion and first and second alternating protrusions formed integrally on the periphery of the body portion, each of the first protrusions being elliptic and including a narrow root in radial section, each of the second protrusions taking the form of a strip in radial section, each of the first protrusions being positioned on the leading side of one of the claws of the first flange, each of the second protrusions being positioned on the trailing side of one of the claws of the first flange, characterized in that a damping mass is fixed, via an elastic member, to the periphery of the first flange in such a manner that the mass can elastically move with respect to the crankshaft in the direction of rotation.

Using this damper, it is possible to place the damper in the space around the periphery of the first flange, which is fixed to the crankshaft of the engine, of the coupling for transmitting motive power from the engine to the pump. This damping mass, which is fixed via the elastomeric member to the first flange which in turn is fixed to one end of the crankshaft, belongs to the vibration system as the crankshaft. The damping mass therefore reduces the torsional vibration and the noise of the crankshaft. Furthermore, the elastomeric buffer in the coupling absorbs torsional vibration transmitted from the engine to the propeller shaft of the pump which even more effectively damps the torsional vibration generated at the propeller shaft.

If the engine is of the type where the carburetor is fixed to the engine through the manifold, it is easy to set the carburetor because the engine vibration is damped.

According to a fourth aspect of this invention, there is provided a damper for damping the torsional vibration caused by the torsional stress acting on a propeller shaft of a propulsion pump mounted on a personal watercraft, characterized in that a damping mass is fixed via an elastomeric member to the periphery of a flange in such a manner that the mass can elastically move with respect to the propeller shaft in the direction of rotation, the flange being fixed to the input end of the propeller shaft which is connected to the engine of the personal watercraft, said flange being a component of a coupling which couples the propeller shaft and the crankshaft of the engine.

This damper, which is simple in structure, can damp the torsional vibration of the propeller shaft and the torsional vibration of the impeller attached to the propeller shaft of the pump. This prevents cavitation on the surface of the impeller blades. It is also possible to prevent the outer ends of the blades from contacting the inner surface of the pump casing due to the torsional vibration. Accordingly, the clearance between the casing and the blades can be small. Consequently, the propulsive efficiency of the pump is high.

The elastomeric member may be fixed via a sleeve to the periphery of the second flange of the coupling. This makes it possible to separately produce the flange of the coupling and other peripheral parts (damper unit) which includes the sleeve, the elastomeric member and the damping mass, and then assemble them. It is also possible to change the damping mass capacity by replacing the sleeve, the elastomeric member and the damping mass together as a unit. It is therefore easy, simple and quick to change the mass.

According to a fifth aspect of this invention, there is provided a damper for damping the torsional vibration caused by the torsional stress acting on a propeller shaft of a propulsion pump mounted on a personal watercraft, characterized in that a damping mass is fixed via an elastomeric member to the periphery of a fitting member in such a manner that the mass can elastically move with respect to the propeller shaft in the direction of rotation, said fitting member being bolted to a side surface of a flange which is fixed to the end of the propeller shaft which is connected to the engine of the personal watercraft, the flange being a component of a coupling which couples the propeller shaft and the crankshaft of the engine.

This damper is easy to mount and remove by tightening and loosening the bolts, respectively. Therefore, it is easy to replace the damping mass with a damping mass having a different capacity or with a new damping mass.

The fitting member may be in the form of a ring, which is shaped like a "T" in axial section, and the damping mass may be positioned around the periphery of the fitting member. This structure is simple because of the damping mass being positioned around the periphery of the flange.

BRIEF DESCRIPTION OF THE DRAWINGS

FIG. 3(a) is where no dampers were used;

FIGS. 3(b) and 3(c) are where dampers having different characteristics were used;

DETAILED DESCRIPTION OF THE EMBODIMENTS

Dampers for a personal watercraft according to one embodiment of the present invention will be described below with reference to the drawings.

Figure 4:
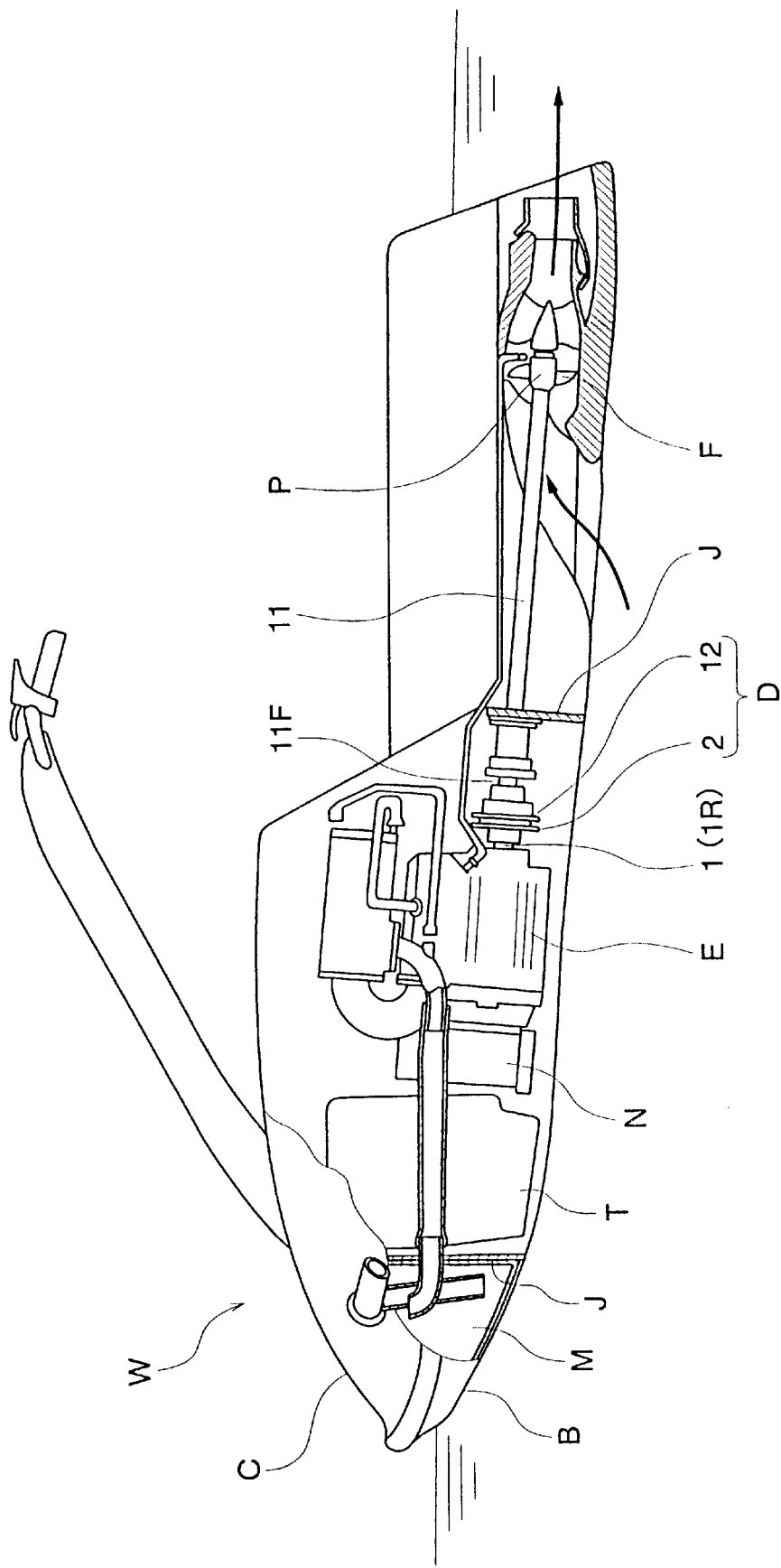
FIG. 4 is a side view of the personal watercraft, partially broken to show the engine and the propulsion pump, to which dampers according to the invention are applied.

FIG. 4 shows a personal watercraft W, to which the invention is applied. The personal watercraft W has a body which includes a hull B and a deck C covering the hull top. In FIG. 4, B shows a hull, J shows a bulkheads, M shows muffler, T shows a fuel tank and N shows a battery.

An engine E is mounted in the space between the hull B and deck C, and is arranged midship. A crankshaft 1 of the engine extends longitudinally along the hull B. A propulsion pump P for propelling the personal watercraft W is mounted in a rear portion of the hull B. A propeller shaft 11 of the pump P extends longitudinally along the hull B.

The adjacent ends of the crankshaft 1 and propeller shaft 11 are coupled together via a coupling D so that the output from the engine E is transmitted to the pump P. The coupling D has a flange 2 fixed to the rear end 1R (see FIG. 4, FIG. 2) of the crankshaft 1 and a flange 12 fixed to the input end 11F (see FIG. 4, FIG. 5) of the propeller shaft 11.

Figure 5A:
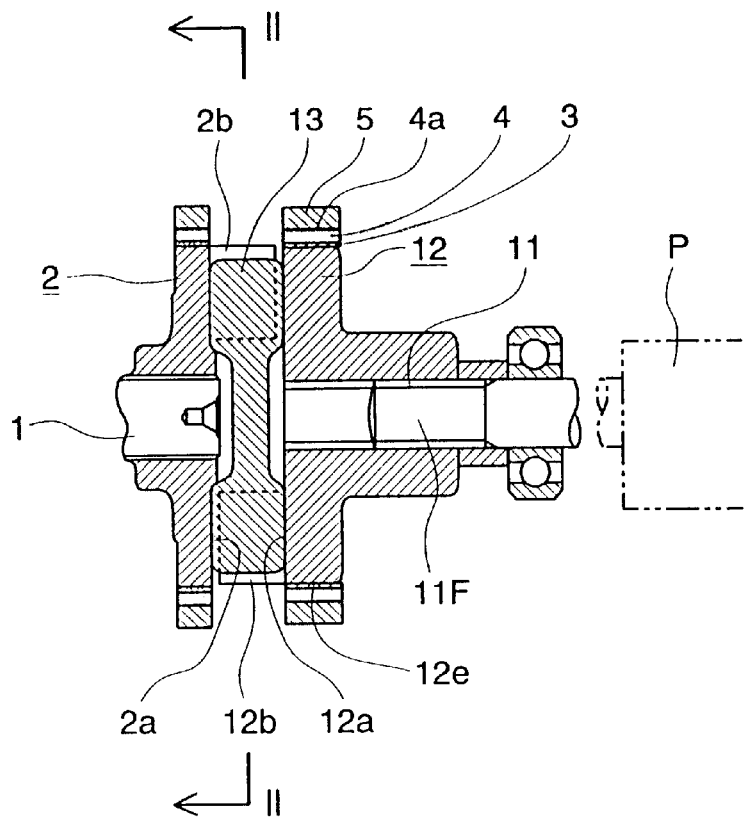
FIG. 5(a) is a side view partially in axial section of part of the coupling, crankshaft and propeller shaft of the personal watercraft.
Figure 5B:
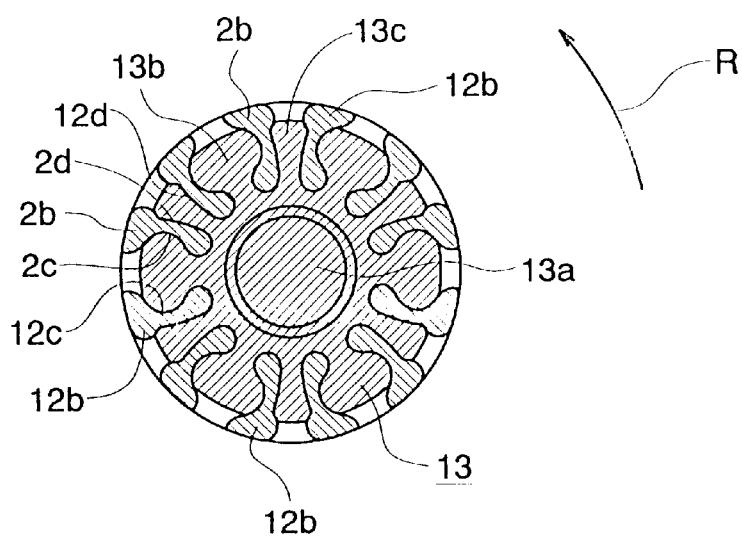
FIG. 5(b) is a radial section taken along line II—II of FIG. 5(a)

As shown in FIGS. 5(a) and 5(b), the flanges 2 and 12 include claws (pawls) 2b and 12b, respectively, formed integrally on the flanges.

The claws 2b and 12b protrude axially toward the opposite surfaces 12a and 2a of the flanges 12 and 2, respectively, in such a manner that the claws 2b overlap with the claws 12b in the direction of rotation (overlap each other in an axial direction looking from the side view).

As shown in FIG. 5(a), the flanges 2 and 12 are interconnected by a circular elastomeric buffer 13 interposed between them. As shown in FIG. 5(b), the buffer 13 includes a body portion 13a generally in the form of a disk and a number of protrusions 13b and 13c formed integrally on the periphery of the body portion 13a. The protrusions 13b alternate with the protrusions 13c in the direction of rotation. Each protrusion 13b is generally elliptic in radial section and includes a narrow root. Each protrusion 13c has the form of a strip in radial section.

As shown in FIG. 5(b), the coupling rotates in the direction R. Each elliptic protrusion 13b of the elastomeric buffer 13 is interposed between the leading side 2c of one of the claws 2b on the flange 2 fixed to the crankshaft 1 and the trailing side 12c of one of the claws 12b on the flange 12 fixed to the propeller shaft 11. Likewise, each strip-like protrusion 13c is interposed between the trailing side 2d of the claw 2b and the leading side 12d of the claw 12b. The structure of the buffer 13 is not limited to that shown in FIGS. 5(a) and 5(b), but may have other structures known to those skilled in the art.

Figure 1:
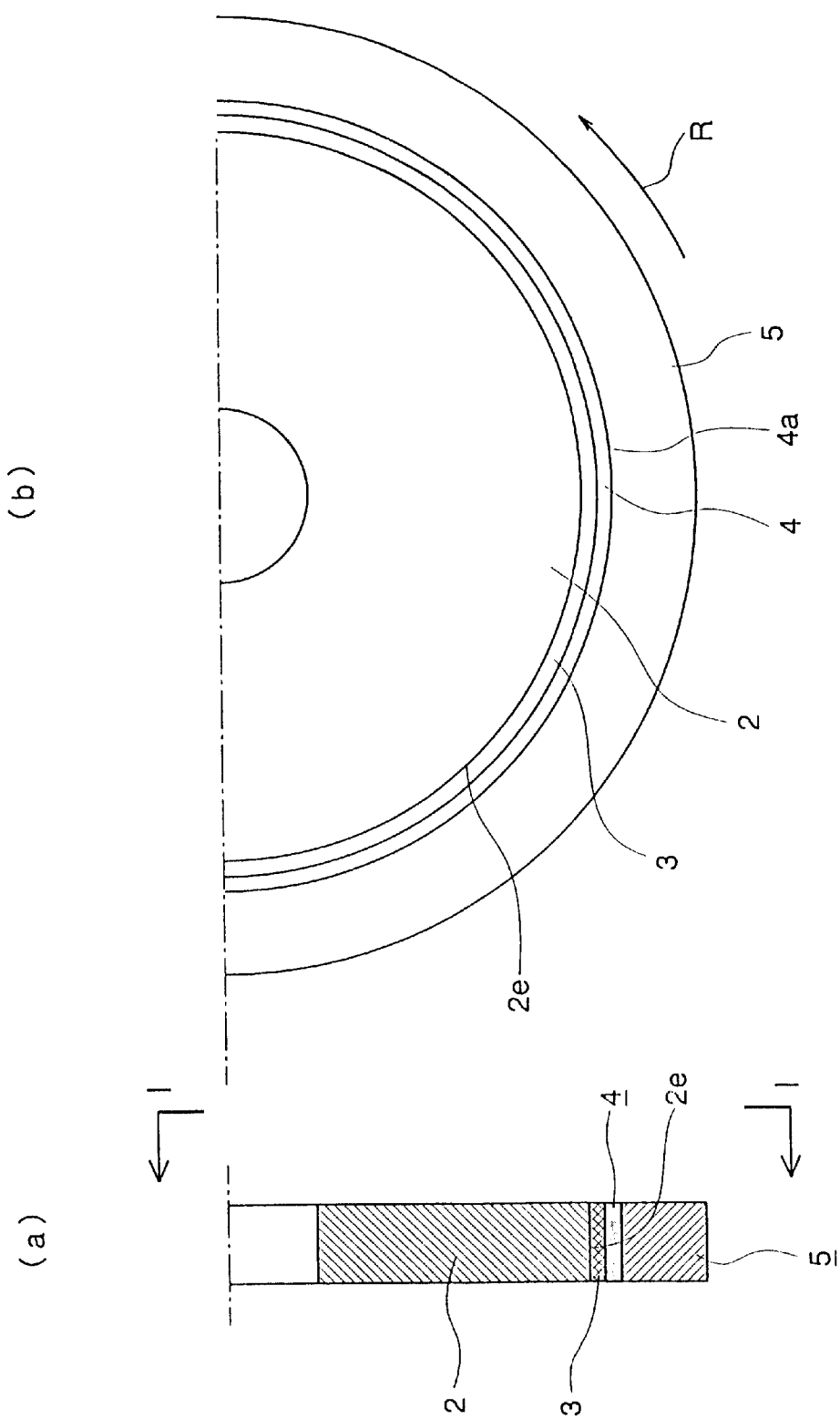
FIG. 1(a) is an axial sectional view of the lower half of a flange of a coupling fixed to the rear end of a crankshaft of an engine mounted on a personal watercraft according to the invention.
FIG. 1(b) is a view taken along line I—I of FIG. 1(a)
Figure 2:
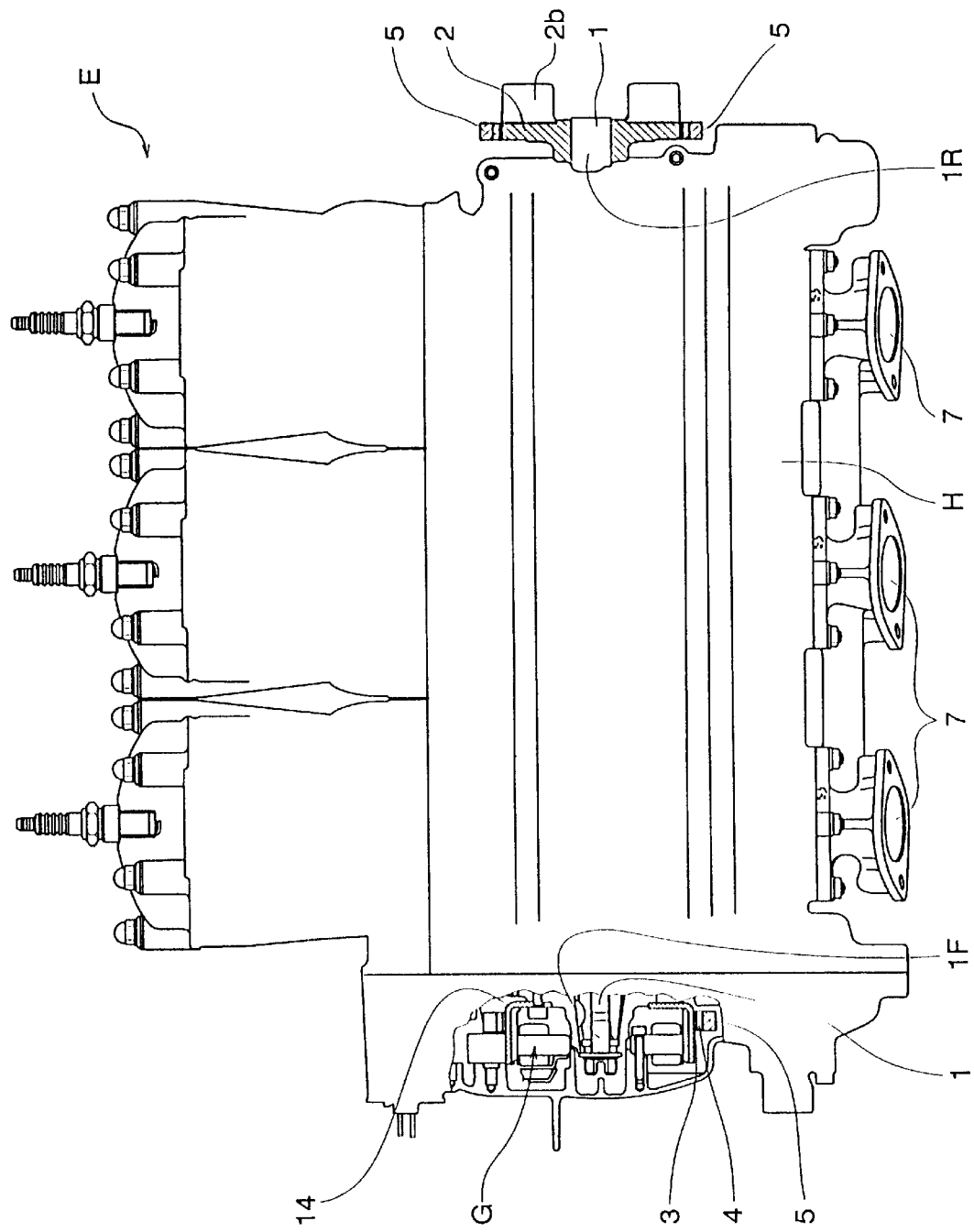
FIG. 2 is a side view partially broken of the engine, which is fitted with dampers and is mounted on the personal watercraft showing FIG. 4.

As also shown in FIG. 2, the flange 2 is fixed to the rear end of the crankshaft 1. As shown partially on an enlarged scale in FIGS. 1(a) and 1(b), a metal sleeve 3 in the shape of a ring is fixed to the peripheral surface 2e of the flange 2 by press fitting, welding or bonding with an adhesive or the like so as to rotate with flange 2.

As already stated with reference to FIG. 5(a), the flange 12 is fixed to the input end of the pump propeller shaft 11 so as to rotate with the shaft 11. A metal sleeve 3 in the form of a ring, which is similar to that shown in FIGS. 1(a) and 1(b), is fixed to the peripheral surface 12e of the flange 12 by press fitting, welding or bonding with an adhesive or the like so as to rotate with the flange 12.

As shown in FIGS. 1(a), 1(b) and 5(a), a damper unit, wherein an annular damping mass or weight 5 is fixed to the peripheral surface of the sleeve 3 through the intermediary of a ring-shaped elastomeric member 4, is formed to be one body. The damper unit is fixed to the peripheral surface of the associated flange 2 or 12, as stated above. More specifically, in this embodiment the damper unit consist of the sleeve 3, the elastomeric member 4, and damping mass 5. The elastomeric member 4 is made of NBR (nitrile butadiene rubber) but may be other elastomeric material made from natural or synthetic polymers which are elastic. Elastomeric member 4 is fixed to the peripheral surface of the sleeve 3 with an adhesive, or by baking (vulcanized bonding) so as to rotate with the sleeve 3. The annular damping mass 5 is made of metal, and fixed to the peripheral surface 4a of the elastomeric member 4 so as to rotate with elastomeric member 4 and move elastically with respect to the sleeve 3 within the range of elasticity of the elastomeric member 4 in the direction R (FIG. 1(b)) or in the opposite direction.

The operation of the damper of the personal watercraft will be described below. When torsional stress causes torsional vibration of the crankshaft 1 or the propeller shaft 11, the damping mass 5 vibrates independently of the crankshaft 1 or propeller shaft 11. Accordingly, by properly selecting a natural frequency of the damper in accordance with the natural frequency of the crankshaft 1 or propeller shaft 11, it is possible to restrain the vibration of the crankshaft 1 or propeller shaft 11 and to prevent noise.

Figure 3A:
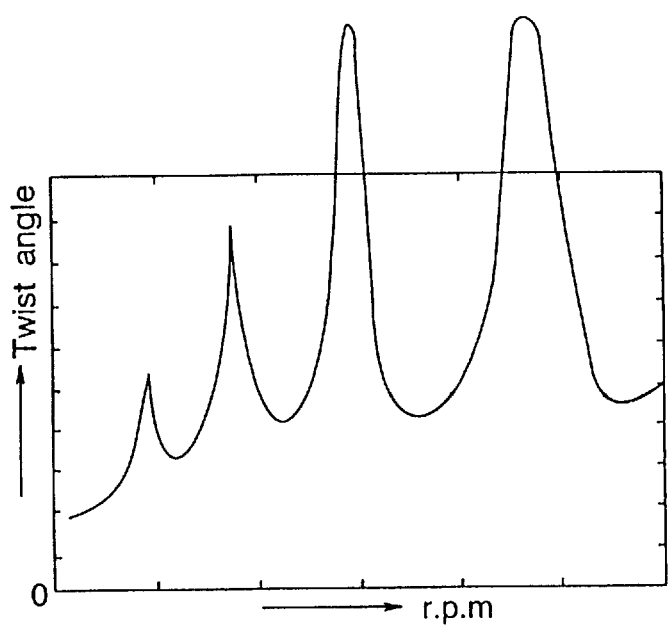
FIGS. 3(a)–3(c) are distribution charts showing, with the axes of abscissas and ordinates representing the engine speed (r.p.m.) and the crankshaft twist angle, respectively, the state of the torsional vibration of the crankshaft.

As shown in FIG. 3(a), the result of an experiment of the inventors, when a torsional stress acting on the crankshaft 1, without a damper as described above, the twist angle of the crankshaft 1 in the rotation created by the torsional vibration peaked at particular rotation frequencies.

Figure 3B:
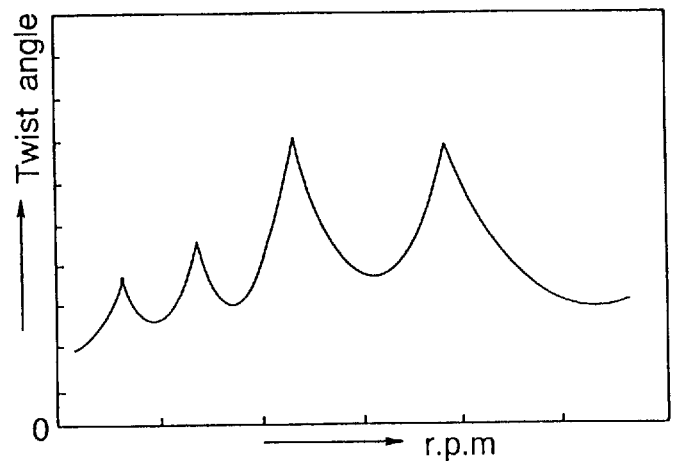

Another experiment was carried out under the conditions stated above, but with a damper constructed as described above, and which was set so that its characteristics were effective in a certain frequency band. As shown in FIG. 3(b), the result of this experiment shows that the maximum twist angle of the crankshaft 1 in this case was 50% less than that shown in FIG. 3(a).

Figure 3C:
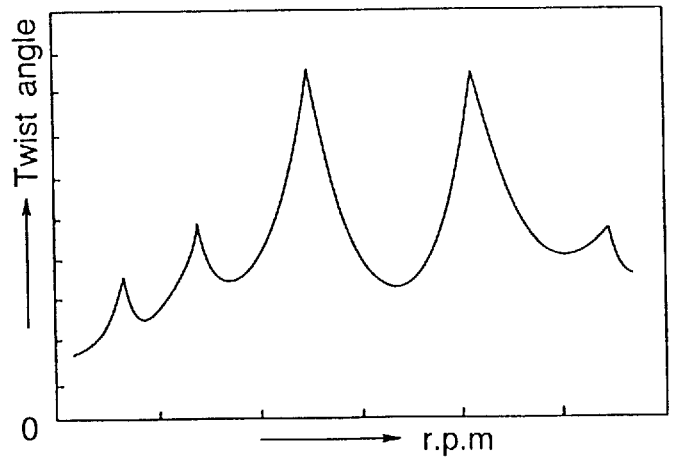

A further experiment was carried out under the same conditions with a damper constructed as described above, and which was set so that its characteristics were effective in another frequency band. As shown in FIG. 3(c), the result of this experiment demonstrates that the maximum twist angle of the crankshaft 1 in this case was about 60% of that shown in FIG. 3(a). It is therefore possible to provide a damper which fits the characteristics of an engine by changing the damper characteristics by varying the modulus of elasticity and/or the damping factor of the elastomeric member 4 and/or the weight of the annular damping mass 5.

The torsional vibration of the pump propeller shaft 11, as well as the engine crankshaft 1, can be damped when the damper is on the flange 12 of the propeller as stated above. As a result, even when the propeller shaft 11 rotates at high revolution speed which is the normal revolution speed range for personal watercraft, the vibration caused by the torsional vibration of the blades F of the propulsion pump P, which is fitted to the rear end of the propeller shaft 11, is damped in comparison with that of the prior art.

Consequently, cavitation on the surface of the blades F of the pump P is decreased. It is therefore possible to prevent reduction of the propulsive force and shortening the life of the blades F because of cavitation. It is also possible to prevent the pump blades F from contacting the pump casing due to torsional vibration, even though there is only a small gap between the casing and the blades because of pump efficiency.

In addition to the dampers at the crankshaft 1 and propeller shaft 11, the coupling means with the elastomeric buffer 13 may be interposed between the flanges 2 and 12 as shown in FIG. 5(a). This reduces the vibration at the connection between the engine E and pump P. As a result, the vibration of the whole drive system of the personal watercraft can be reduced more effectively. When the torsional vibration caused by the torsional stress decreases, the vibration and noise of the personal watercraft decrease. This gives a feeling of high smoothness when planing. Moreover, the torsional rigidity of the crankshaft 1 and propeller shaft 11 is lower. As a result, the crankshafts 1 and propeller shaft 11 may be lighter in weight, improving the planing performance and fuel consumption.

Figure 6:
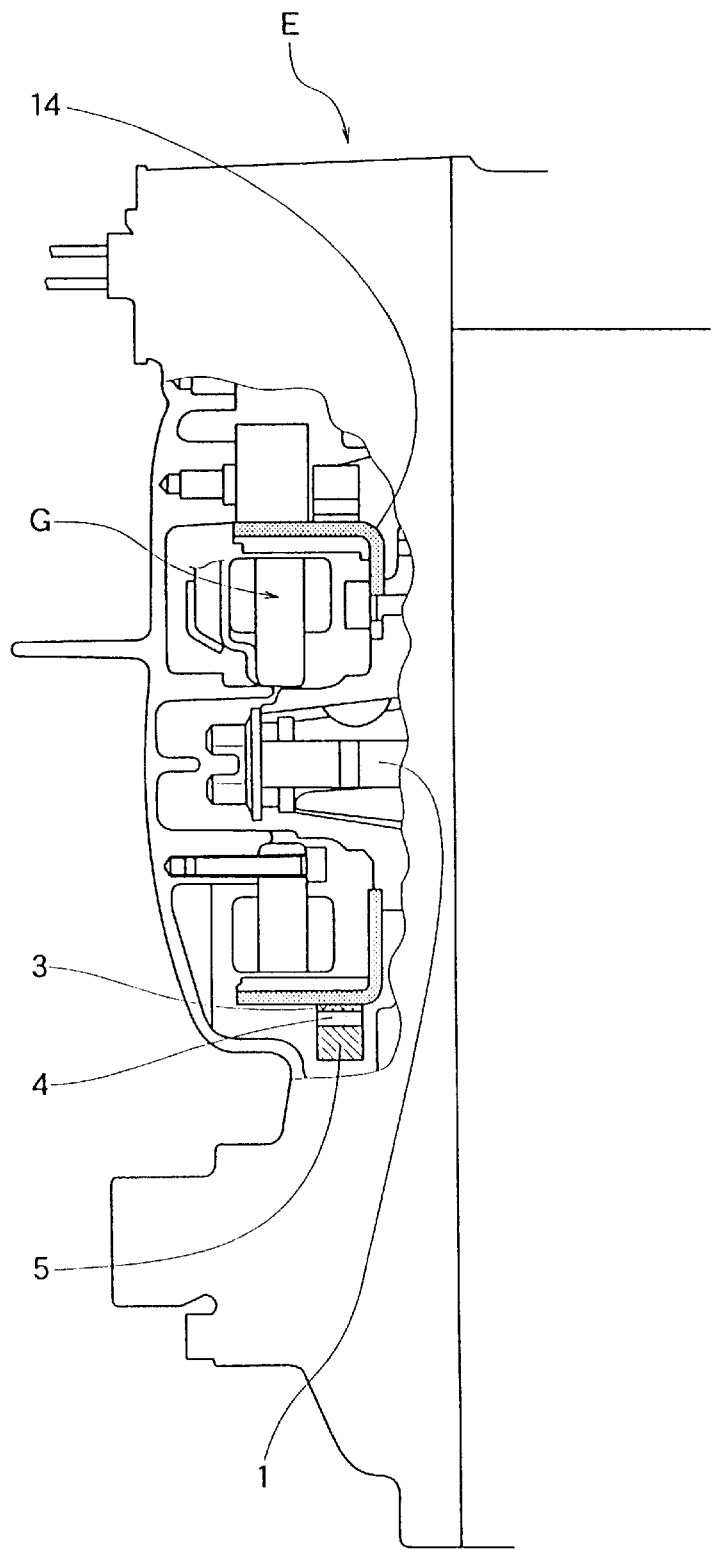
FIG. 6 is an enlarged view of part of FIG. 2, showing the generator and peripheral parts of the engine.

As shown in FIGS. 2 and 6, the engine E is fitted with a generator G at the front end (left end in FIG. 2) IF of the crankshaft 1 in the engine casing. The generator G includes a generally cylindrical magneto rotor 14, which is fixed to the front end of the crankshaft 1 so as to rotate with the crankshaft 1. As stated already, a damper is fitted to the rear end of the crankshaft 1. In place of or in addition to this damper, a second damper may be fitted on the periphery of the magneto rotor 14 of the generator G. The second damper includes an annular damping mass 5 fixed by sleeve 3 and an elastomeric member 4 to the periphery of the rotor 14.

In particular, if the dampers (one of the dampers shown in FIG. 5(a) and the second damper) are thus fitted at both ends of the crankshaft 1, and each damper has a different natural frequency, it is possible to increase the frequency range where the damping effect is obtained. This makes it possible to obtain a damping effect in a fairly wide speed range of the engine.

The engine E includes a carburetor (not shown) as a fuel supply means, which is bolted to the manifold 7 which in turn is bolted to the crankcase H (FIG. 2). Accordingly, engine vibration is transmitted directly to the carburetor. The reduction in engine vibration by the dampers suppresses the spillage of fuel into the suction passage of the carburetor. Therefore, it is very easy to set the carburetor, and this setting may be maintained even during planing of the personal watercraft.

As already stated, the annular damping mass 5 surrounds the elastomeric member 4 adhered or fixed to the periphery of sleeve 3. Such a damper can be fitted (mounted) easily and simply by press fitting, using an adhesive, or by mechanical engagement or the like, to the flange of the coupling between the engine and the propulsion pump of an existing personal watercraft.

If necessary, it is possible to replace the damper with a new one by removing the sleeve 3 together with the elastomeric member 4 and the damping mass 5 from the coupling flange. Of course, the whole flange (or the whole rotor of the generator) may be replaced.

As already stated, the damper unit which consist of the sleeve 3, the elastomeric member 4 and damping mass 5 may be produced as a unit, then the damper unit is fixed to the periphery of the flanges 2, 12 of the coupling. Of course, after the sleeve 3 is fixed to the flange 2 or 12, the elastomeric member 4 and damping mass 5 may be fixed to the sleeve 3.

The elastomeric member 4 may, without using the sleeve 3, be directly fixed to the flange 2 or 12 or the magneto rotor 14 with an adhesive or the like. In such case, the number of parts can be reduced.

A damper unit which consists of a sleeve, an elastomeric member and an annular damping mass may be connected by splines to the periphery of the flange. In this case, the damper may be kept from moving axially with respect to the flange by a circlip, snap ring or the like. The inner surface of the sleeve 3 might also be serrated for connection by press fitting to the flange 2 or 12. The sleeve 3 might also be fixed to the flange 2 or 12 by screws.

Figure 7:
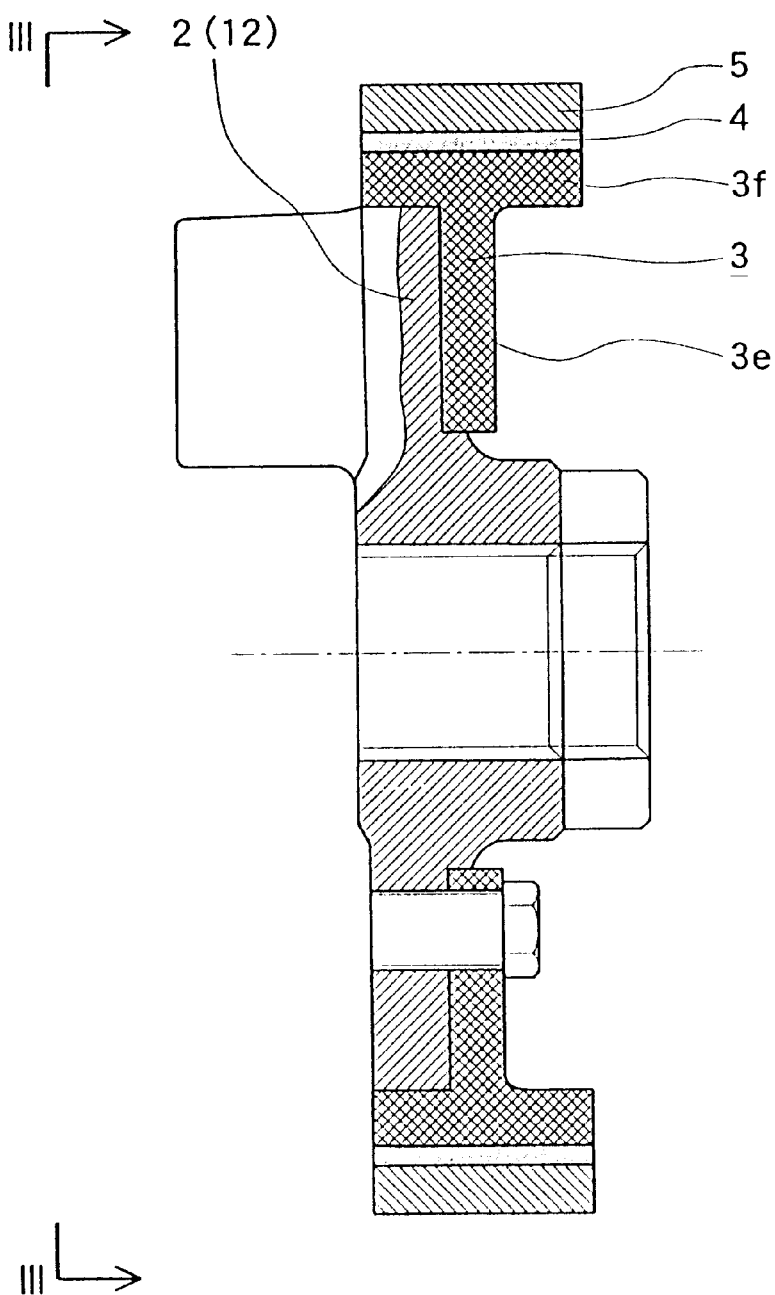
FIG. 7 is an axial section taken along line IV—IV of FIG. 8, showing the sleeve, elastomeric member and damping mass of a flange of a coupling according to an embodiment different from FIGS. 5(a) and 5(b)
Figure 8:
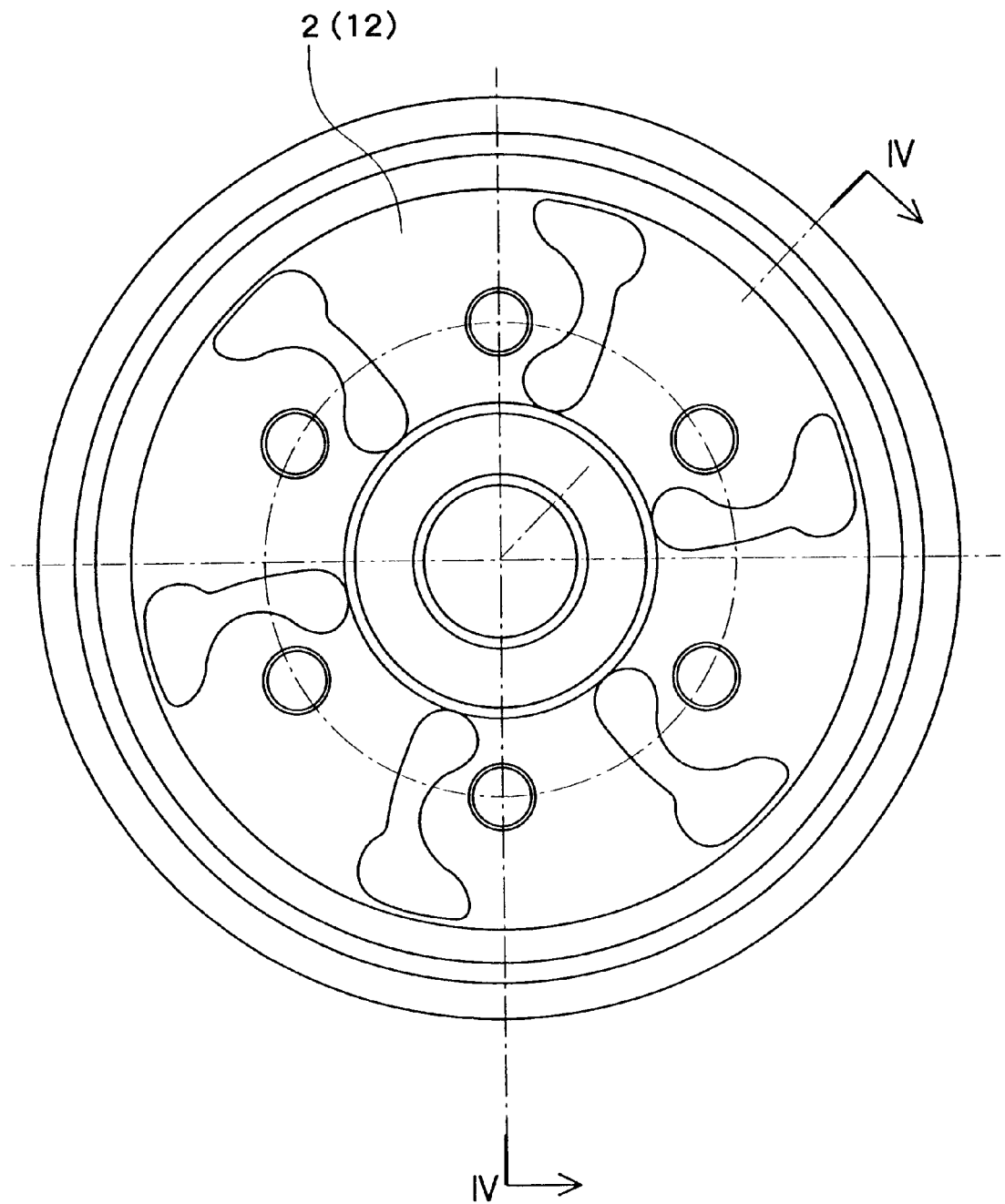
FIG. 8 is a view taken along line III—III of FIG. 7.
Figure 9:
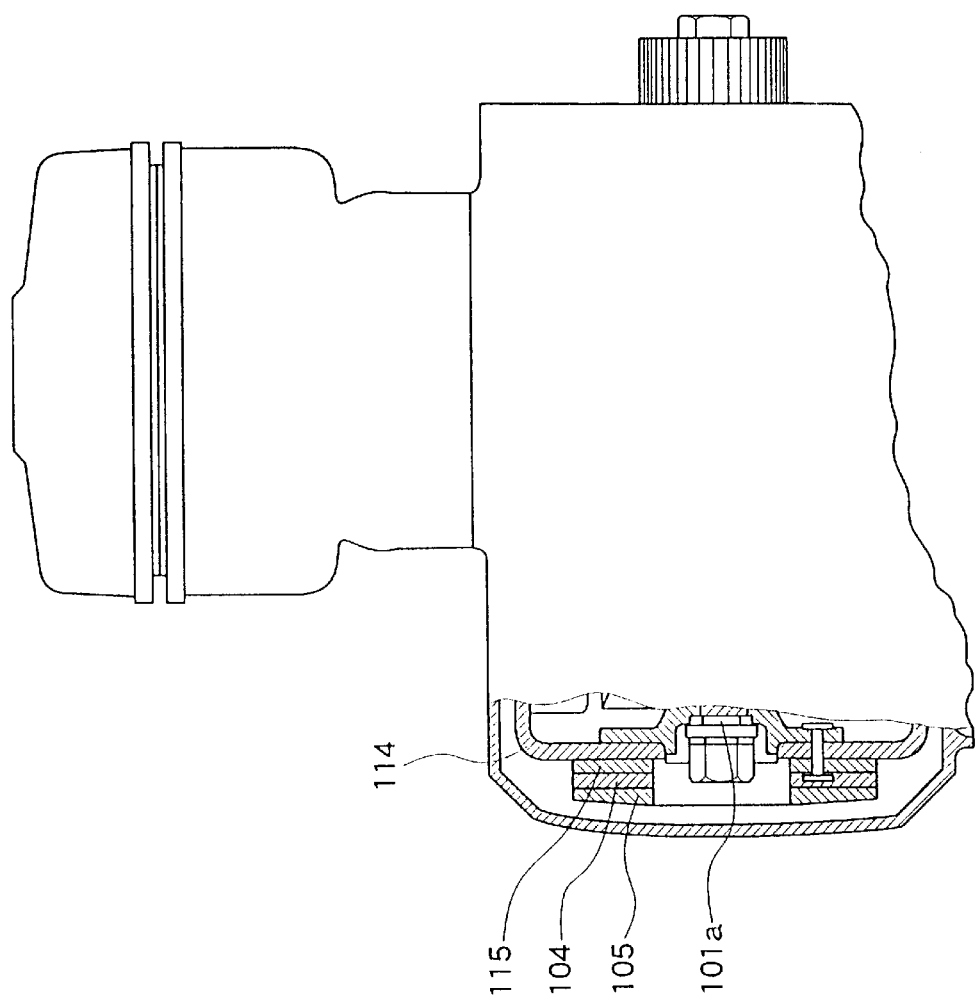
FIG. 9 is a side view of a motorcycle engine, partially broken to show the prior art's damper.
Figure 10:
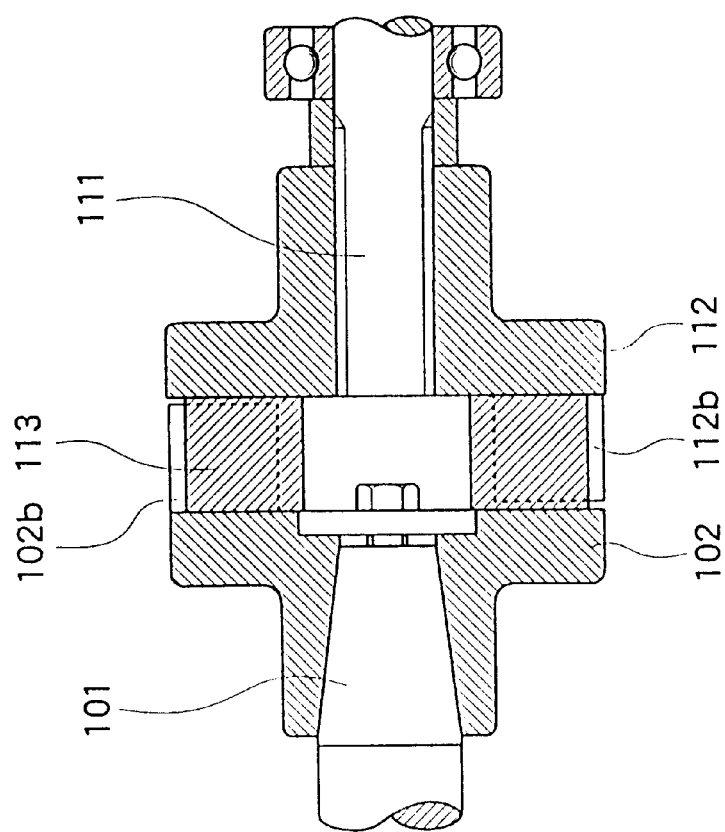
FIG. 10 is a side view partially in axial section showing a known coupling for interconnecting the crankshaft of the engine and the propeller shaft of the propulsion pump mounted on a personal watercraft.

FIGS. 7 and 8 show another embodiment of the invention. With reference to FIG. 7, a fitting member 3 is provided which is shaped like a ring in front view and a "T" shape in axial section on its axis. The fitting member 3 has a flange portion 3e which is bolted to a side face of a flange 2 or 12. The outer portion 3f is attached to damping mass 5 via elastomeric member 4. In this case, the fitting member 3, elastomeric member 4 and annular damping mass 5 are assembled as a damper unit before fitting to the flange 2 or 12, then this damper unit is bolted to the flange 2 or 12. The damping mass 5 can elastically move with respect to the flange 2 of the crankshaft 1 or flange 12 of the propeller shaft 11 in the direction of rotation. The damper unit is easier to fit and remove.

What is claimed is:

1. A damper for damping torsional vibration caused by torsional stress acting on a crankshaft of an engine for propulsion mounted on a personal watercraft, the damper comprising:

a first damper, the first damper comprising:
a flange fixed to a first end of the crankshaft, the flange being a component of a coupling that couples the crankshaft and a propeller shaft of a propulsion pump;
a first damping mass fixed to a periphery of the flange by a first elastomeric member in such a manner that the mass can elastically move with respect to the crankshaft in a direction of rotation; and a second damper, the second damper comprising:

a second damping mass fixed to a periphery of a magneto rotor of a generator by a second elastomeric member in such a manner that the second mass can elastically move with respect to the crankshaft in the direction of rotation, the magneto rotor being fixed to a second end of the crankshaft.

2. A damper according to claim 1 wherein: the first elastomeric member is fixed to the periphery of the flange by a sleeve.

3. A damper for damping torsional vibration caused by torsional stress acting on a crankshaft of an engine for propulsion mounted on a personal watercraft, the damper comprising:

a flange affixed to a first end of the crankshaft;

a fitting member bolted to a side surface of the flange; and a damping mass fixed to a periphery of the fitting member by an elastomeric member in such a manner that the mass can elastically move with respect to the crankshaft in a direction of rotation;

the flange being a component of a coupling which couples the crankshaft and a propeller shaft of a propulsion pump.

4. A damper according to claim 3 wherein:

the fitting member has the form of a ring shaped substantially like a "T" in axial section; and the damping mass is positioned around the periphery of the fitting member.

5. A vibration-damped personal watercraft comprising:

a personal watercraft hull;

an engine fixed to the hull for propelling the watercraft, the engine including a crankshaft;

a propulsion pump having a propeller fixed to a propeller shaft;

a propeller coupling for coupling the propeller shaft to the crankshaft, said propeller coupling including:

first and second flanges, each of the flanges including claws protruding axially toward the other flange, the claws of the first flange alternating with the claws of the second flange in a direction of rotation;

an elastomeric buffer interposed between said flanges for transmitting power from the engine to the pump, said elastomeric buffer including:

a circular body portion; and first and second alternating protrusions formed integrally on a periphery of said circular body portion, each of the first protrusions being elliptic and including a narrow root in radial section, each of the second protrusions having the form of a strip in radial section, each of the first protrusions being positioned on a leading edge of one of the claws of the first flange, each of the second protrusions being positioned on a trailing side of one of the claws of the second flange; and a damping mass fixed to the periphery of the first flange by an elastomeric member in such a manner that the mass can elastically move with respect to the crankshaft in the direction of rotation.

6. A vibration-damped personal watercraft according to claim 5 wherein:

the engine includes a manifold and a carburetor fixed thereto through the manifold.

7. A damper for damping torsional vibration caused by torsional stress acting on a propeller shaft of a propulsion pump mounted on a personal watercraft, the damper comprising:

a flange fixed to the input end of the propeller shaft, the input end being connected to an engine of the personal watercraft, the flange being a component of a coupling which couples the propeller shaft and the crankshaft of an engine; and a damping mass fixed to a periphery of the flange by an elastomeric member in such a manner that the mass can elastically move with respect to the crankshaft in a direction of rotation.

8. A damper according to claim 7 wherein:

the elastic member is fixed to the periphery of the flange by a sleeve.

9. A damper for damping torsional vibration caused by torsional stress acting on a propeller shaft of a propulsion pump mounted on a personal watercraft, the damper comprising:

a flange affixed to an end of the propeller shaft, said propeller shaft end being connected to an engine of the personal watercraft;

a fitting member bolted to a side surface of the flange; and a damping mass fixed to a periphery of the fitting member by an elastomeric member in such a manner that the mass can elastically move with respect to the propeller shaft in a direction of rotation;

the flange being a component of a coupling which couples the propeller shaft and a crankshaft of the engine.

10. A damper according to claim 9 wherein:

the fitting member has the form of a ring which is shaped substantially like a "T" in axial section; and the damping mass is positioned around the periphery of the fitting member.

* * * * *